(12) United States Patent
Tang et al.

(10) Patent No.: US 11,269,324 B2
(45) Date of Patent: Mar. 8, 2022

(54) METHOD AND APPARATUS FOR CONTROLLING AUTONOMOUS VEHICLE

(71) Applicant: Baidu Online Network Technology (Beijing) Co., Ltd., Beijing (CN)

(72) Inventors: Mengmeng Tang, Beijing (CN); Wanqi Chai, Beijing (CN); Junping Wang, Beijing (CN); Fan Yang, Beijing (CN); Xiaohua Yang, Beijing (CN); Jing Li, Beijing (CN); Chen Chen, Beijing (CN); Shi Hu, Beijing (CN); Xuan Huang, Beijing (CN); Yan Feng, Beijing (CN); Wenlong Rao, Beijing (CN); Haifeng Li, Beijing (CN); Gao Yu, Beijing (CN); Ning Yu, Beijing (CN); Shuang Zhang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 178 days.

(21) Appl. No.: 16/664,195

(22) Filed: Oct. 25, 2019

(65) Prior Publication Data
US 2020/0150651 A1 May 14, 2020

(30) Foreign Application Priority Data

Nov. 9, 2018 (CN) .......................... 201811333575.X

(51) Int. Cl.
*G05D 1/00* (2006.01)
*B60W 30/09* (2012.01)

(52) U.S. Cl.
CPC ........... *G05D 1/0055* (2013.01); *B60W 30/09* (2013.01); *G05D 1/0088* (2013.01);
(Continued)

(58) Field of Classification Search
CPC ............... G05D 1/0055; G05D 1/0088; G05D 2201/0213; B60W 30/09; B60W 2554/00; B60W 2720/106
See application file for complete search history.

(56) References Cited

U.S. PATENT DOCUMENTS

| 6,362,729 B1* | 3/2002 | Hellmann .......... B60K 31/0008 |
| | | 340/436 |
| 2009/0248267 A1* | 10/2009 | Boecker ................ B60W 30/17 |
| | | 701/70 |

(Continued)

FOREIGN PATENT DOCUMENTS

| CN | 106347172 A | 1/2017 |
| CN | 107985165 A | 5/2018 |

(Continued)

*Primary Examiner* — Jelani A Smith
*Assistant Examiner* — Frank T Glenn, III
(74) *Attorney, Agent, or Firm* — Nixon Peabody LLP

(57) ABSTRACT

A method and an apparatus for controlling an autonomous vehicle are provided according to the embodiments of the disclosure. The method includes: sending, in response to determining that a pedestrian is in a first target area, behavior prompt information representing prompting the pedestrian to make a corresponding behavior; determining whether a deceleration condition matching the behavior prompt information is satisfied based on acquired behavior information of the pedestrian; and sending control information for reducing a moving speed of the autonomous vehicle, in response to determining that the deceleration condition is satisfied and determining that a speed of the autonomous vehicle is greater than a preset deceleration threshold. According to the embodiments, deceleration control of the autonomous vehicle is achieved based on the response of the pedestrian to the behavior prompt information.

14 Claims, 7 Drawing Sheets

(52) U.S. Cl.
CPC ... *B60W 2554/00* (2020.02); *B60W 2720/106* (2013.01); *G05D 2201/0213* (2013.01)

(56) References Cited

U.S. PATENT DOCUMENTS

| | | | |
|---|---|---|---|
| 2017/0021768 A1 | 1/2017 | Jaegal | |
| 2017/0072950 A1* | 3/2017 | Sim | B60W 10/184 |
| 2017/0120903 A1* | 5/2017 | Lavoie | B60W 30/18036 |
| 2018/0259966 A1* | 9/2018 | Long | G05D 1/0246 |
| 2018/0326982 A1* | 11/2018 | Paris | G05D 1/0088 |
| 2018/0341257 A1* | 11/2018 | Nordbruch | B60T 7/12 |

FOREIGN PATENT DOCUMENTS

| | | | | |
|---|---|---|---|---|
| CN | 108109413 A | 6/2018 | | |
| CN | 108275072 A | 7/2018 | | |
| CN | 108573364 A | 9/2018 | | |
| CN | 108717798 A | 10/2018 | | |
| CN | 109515449 A | 3/2019 | | |
| JP | H0772249 A | 3/1995 | | |
| WO | WO 2017/155740 A1 * | 9/2017 | | G05D 1/00 |

\* cited by examiner

METHOD AND APPARATUS FOR CONTROLLING AUTONOMOUS VEHICLE

CROSS-REFERENCE TO RELATED APPLICATIONS

This application claims priority to Chinese Patent Application No. 201811333575.X, filed on Nov. 9, 2018, titled "Method and Apparatus for Controlling Autonomous Vehicle," which is hereby incorporated by reference in its entirety.

TECHNICAL FIELD

Embodiments of the present disclosure relate to the field of autonomous vehicle, specifically to a method and apparatus for controlling an autonomous vehicle.

BACKGROUND

With the rapid development of technology in the field of artificial intelligence, the autonomous vehicle technology is also improving. Generally, the travelling of an autonomous vehicle may be controlled based on the perception of the surrounding environment by the autonomous vehicle.

SUMMARY

Embodiments of the present disclosure propose a method and apparatus for controlling an autonomous vehicle.

In a first aspect, the embodiments of the present disclosure provide a method for controlling an autonomous vehicle, including: sending, in response to determining that a pedestrian is in a first target area, behavior prompt information representing prompting the pedestrian to make a corresponding behavior; determining whether a deceleration condition matching the behavior prompt information is satisfied based on acquired behavior information of the pedestrian; and sending control information for reducing a moving speed of the autonomous vehicle, in response to determining that the deceleration condition is satisfied and determining that a speed of the autonomous vehicle is greater than a preset deceleration threshold.

In some embodiments, the method further includes: sending control information for stopping a movement of the autonomous vehicle, in response to determining that the pedestrian is in a second target area and determining that the autonomous vehicle is in a moving state.

In some embodiments, the behavior prompt information includes information representing prompting the pedestrian to approach to stop the vehicle; and the determining whether a deceleration condition matching the behavior prompt information is satisfied, includes: determining that the deceleration condition matching the behavior prompt information is satisfied, in response to determining that the pedestrian is in a third target area.

In some embodiments, the method further includes: sending control information for emergency braking of the autonomous vehicle, in response to determining that an object is in a fourth target area and determining that the autonomous vehicle is in the moving state.

In some embodiments, the method further includes: determining whether the object is in the fourth target area; determining whether the autonomous vehicle is in a parking state; and sending control information for moving the autonomous vehicle, in response to determining that no object is in the fourth target area and determining that the autonomous vehicle is in the parking state.

In some embodiments, the method further includes: sending movement prompt information representing prompting yielding, in response to determining that the object is in the fourth target area.

In some embodiments, the sending control information for moving the autonomous vehicle, includes: acquiring information representing whether a target vehicle-mounted device is in use; and sending the control information for moving the autonomous vehicle, in response to determining that the acquired information is information representing that the target vehicle-mounted device is not in use.

In some embodiments, the sending control information for moving the autonomous vehicle, includes: acquiring state information representing whether the target vehicle-mounted device malfunctions; and sending the control information for moving the autonomous vehicle, in response to determining that the target vehicle-mounted device does not malfunction.

In a second aspect, the embodiments of the present disclosure provide an apparatus for controlling an autonomous vehicle, including: a first sending unit, configured to send, in response to determining that a pedestrian is in a first target area, behavior prompt information representing prompting the pedestrian to make a corresponding behavior; a first determining unit, configured to determine whether a deceleration condition matching the behavior prompt information is satisfied based on acquired behavior information of the pedestrian; and a second sending unit, configured to send control information for reducing a moving speed of the autonomous vehicle, in response to determining that the deceleration condition is satisfied and determining that a speed of the autonomous vehicle is greater than a preset deceleration threshold.

In some embodiments, the apparatus further includes: a third sending unit, configured to send control information for stopping a movement of the autonomous vehicle, in response to determining that the pedestrian is in a second target area and determining that the autonomous vehicle is in a moving state.

In some embodiments, the behavior prompt information includes information representing prompting the pedestrian to approach to stop the vehicle; and the first determining unit is further configured to: determine that the deceleration condition matching the behavior prompt information is satisfied, in response to determining that the pedestrian is in a third target area.

In some embodiments, the apparatus further includes: a fourth sending unit, configured to send control information for emergency braking of the autonomous vehicle, in response to determining that an object is in a fourth target area and determining that the autonomous vehicle is in the moving state.

In some embodiments, the apparatus further includes: a second determining unit, configured to determine whether the object is in the fourth target area; a third determining unit, configured to determine whether the autonomous vehicle is in a parking state; and a fifth sending unit, configured to send control information for moving the autonomous vehicle, in response to determining that no object is in the fourth target area and determining that the autonomous vehicle is in the parking state.

In some embodiments, the apparatus further includes: a sixth sending unit, configured to send movement prompt information representing prompting yielding, in response to determining that the object is in the fourth target area.

In some embodiments, the fifth sending unit includes: an acquisition module, configured to acquire information representing whether a target vehicle-mounted device is in use; and a sending module, configured to send the control information for moving the autonomous vehicle, in response to determining that the acquired information is information representing that the target vehicle-mounted device is not in use.

In some embodiments, the sending module includes: an acquisition submodule, configured to acquire state information representing whether the target vehicle-mounted device malfunctions; and a sending submodule, configured to send the control information for moving the autonomous vehicle, in response to determining that the target vehicle-mounted device does not malfunction.

in a third aspect, the embodiments of the present disclosure provide an electronic device, including: one or more processors; a storage apparatus, storing one or more programs thereon; and the one or more programs, when executed by the one or more processors, cause the one or more processors to implement the method according to any one of the implementations in the first aspect.

In a fourth aspect, the embodiments of the present disclosure provide an autonomous vehicle including the electronic device as described in the third aspect.

In a fifth aspect, the embodiments of the present disclosure provide a computer readable medium, storing a computer program thereon, the program, when executed by a processor, implements the method according to any one of the implementations in the first aspect.

According to the method and apparatus for controlling an autonomous vehicle provided by the embodiments of the present disclosure, first in response to determining that a pedestrian is in a first target area, behavior prompt information representing prompting the pedestrian to make a corresponding behaviour is sent, then whether a deceleration condition matching the behavior prompt information is satisfied is determined based on acquired behavior information of the pedestrian, and control information for reducing a moving speed of the autonomous vehicle is sent, in response to determining that the deceleration condition is satisfied and determining that a speed of the autonomous vehicle is greater than a preset deceleration threshold, thereby implementing deceleration control of the autonomous vehicle based on the response of the pedestrian to the behavior prompt information.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
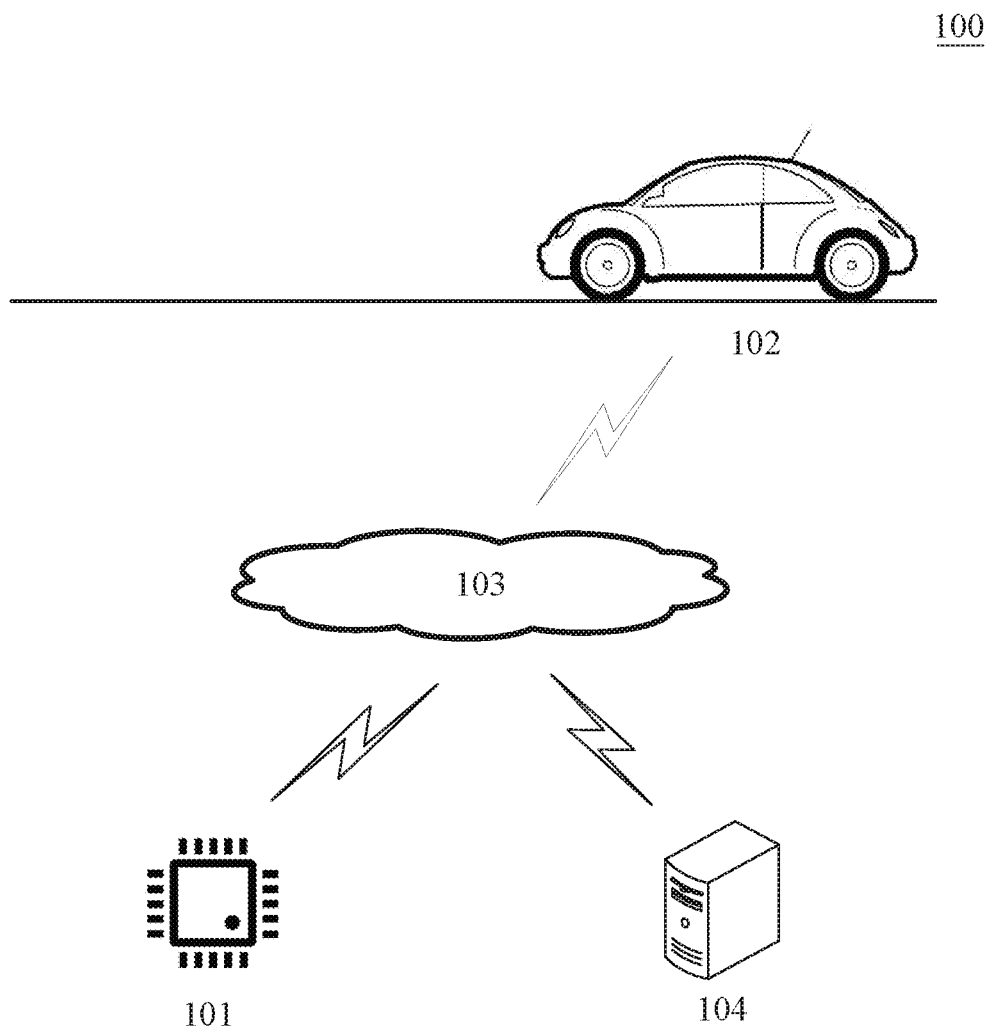
FIG. 1 is an exemplary system architecture diagram to which an embodiment of the present disclosure may be applied.

FIG. 1 illustrates an exemplary system architecture 100 of a method for controlling an autonomous vehicle or an apparatus for controlling an autonomous vehicle to which the present disclosure may be applied.

As shown in FIG. 1, the system architecture 100 may include a control apparatus 101, an autonomous vehicle system 102, a network 103, and a server 104. The network 103 is used to provide a communication link medium between the control apparatus 101, the autonomous vehicle system 102 and the server 104. The network 103 may include various types of connections, such as wired, wireless communication links, or optic fibers.

The control apparatus 101 and the autonomous vehicle system 102 may interact with the server 104 through the network 103, to receive or send messages and the like. Various communication client applications, such as instant messaging tools, or mailbox clients may be installed on the autonomous vehicle system 102.

The control apparatus 101 and the autonomous vehicle system 102 may be hardware or software. When being hardware, the autonomous vehicle system 102 may be an autonomous vehicle capable of achieving automatic driving. When being hardware, the control apparatus 101 may be a processor possessing computing capability. The processor may control the autonomous vehicle system 102. It should be noted that the control apparatus 101 may be integrated in the autonomous vehicle system 102 or may be arranged separately from the autonomous vehicle system 102.

When being software, the control apparatus 101 and the autonomous vehicle system 102 may be installed in the above-listed processor and autonomous vehicle, respectively. The control apparatus 101 and the autonomous vehicle system 102 may be implemented as a plurality of software or software modules (for example, for providing distributed services) or as a single software or software module, which is not specifically limited herein.

The server 104 may be a server that provides various services, such as a backend server that provides support for the autonomous vehicle system 102 to achieve autonomous driving. The control apparatus 101 may send information representing the operation state of autonomous vehicle system 102 to the background server. The background server may perform analysis and processing based on the above information, and generate a processing result. Further, the background server may also feed back the generated processing result to the control apparatus 101 and the autonomous vehicle system 102.

it should be noted that the server may be hardware or software. When being hardware, the server may be implemented as a distributed server cluster composed or a plurality of servers, or as a single server. When being software, the server may be implemented as a plurality of software or software modules (for example, for providing distributed services) or as a single software or software module, which is not specifically limited herein.

It should be noted that the method for controlling an autonomous vehicle provided by the embodiments of the present disclosure is generally performed by the control apparatus 101, accordingly, the apparatus for controlling an autonomous vehicle is generally disposed in the control apparatus 101.

It should be understood that the number of control apparatuses, autonomous vehicle systems, networks and servers in FIG. 1 is merely illustrative. Depending on the implementation needs, there may be any number of control apparatuses, autonomous vehicle systems, networks and servers.

Figure 2:
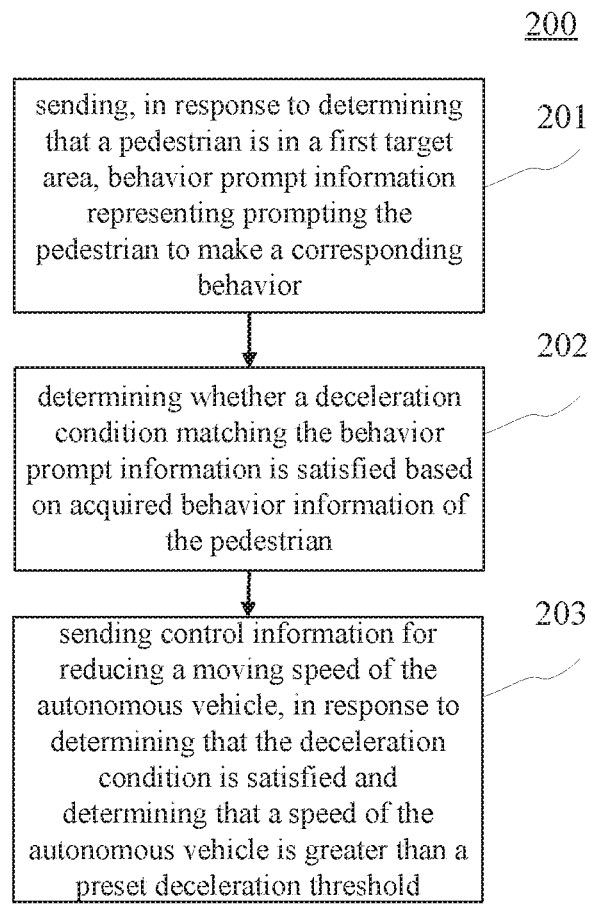
FIG. 2 is a flowchart of an embodiment of a method for controlling an autonomous vehicle according to the present disclosure.

With further reference to FIG. 2, a flow 200 of an embodiment of a method for controlling an autonomous vehicle according to the present disclosure is illustrated. The method for controlling an autonomous vehicle includes the following steps 201 to 203.

Step 201, sending, in response to determining that a pedestrian is in a first target area, behavior prompt information representing prompting the pedestrian to make a corresponding behavior.

in the present embodiment, an executing body of the method for controlling an autonomous vehicle (for example, the control apparatus 101 shown in FIG. 1) may determine whether the pedestrian is in the first target area using various pedestrian detection technologies. As an example, an image sequence captured by a camera installed on the autonomous vehicle may be used as input, and a classifier such as a SVM (Support Vector Machine), an Adaboost (a self-adaptive boosting classifier) or a DNN (Deep Neural Networks) may be used to identify the input image to determine whether there is a pedestrian image in the image. Then, based on data acquired by a laser radar installed on the autonomous vehicle, the distance between the detected pedestrian and the autonomous vehicle is determined. Next, whether the pedestrian is in the first target area is determined based on the distance. As another example, the laser radar may be used to detect whether there is an object in the first target area; if there is the object in the first target area, the image in the first target area is recognized to determine whether there is the pedestrian image. The technology for image recognition to determine whether there is the pedestrian image in the image may use a recognition method similar to the classifier, and detailed description thereof will be omitted.

Figure 3A:
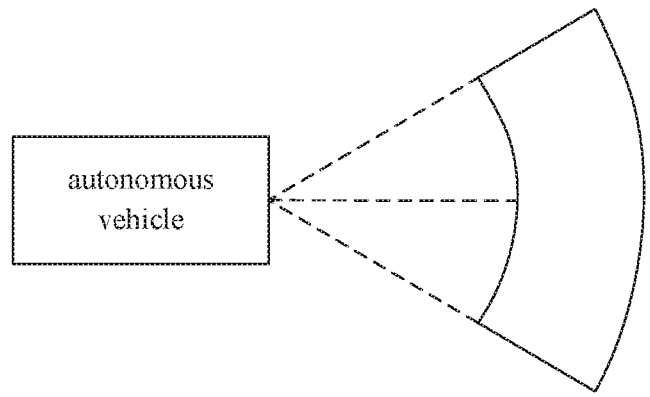
FIGS. 3A, 3B, and 3D are top views for illustrating target areas of the method for controlling an autonomous vehicle according to an embodiment of the present disclosure.
Figure 3B:
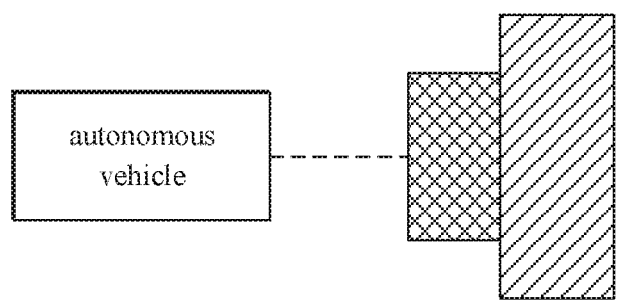
Figure 3C:
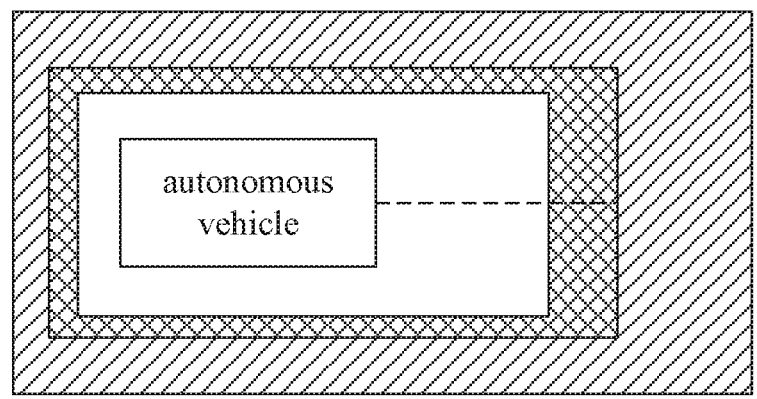

In the present embodiment, the first target area may be an area from which the distance to the autonomous vehicle satisfies a preset distance condition. As an example, the first target area may be a sector ring area as shown in FIG. 3A. The sector ring area may be an area formed by using the center point of the front end of the autonomous vehicle as a center, a first preset distance and a second preset distance as radii, and a preset angle as a central angle. As another example, the first target area may alternatively be a rectangular area, as the oblique line area shown in FIG. 3B. The distance between the rectangular area and the center point of the front end of the autonomous vehicle may be a third preset distance. As another example, the first target area may alternatively be an area formed by two rectangles of different sizes surrounding the autonomous vehicle, as the oblique line area shown in FIG. 3C. Generally, the first target area is symmetrical about the center line of the driving direction of the autonomous vehicle. It may be understood that the values of the first preset distance, the second preset distance, the third preset distance, and the length and width of the rectangular area may be set according to the experience of those skilled in the art, historical data, and actual application requirements.

In the present embodiment, in response to determining that the pedestrian is in the first target area, the executing body may send the behavior prompt information representing prompting the pedestrian to make a corresponding behavior. The behavior prompt information may take many forms. As an example, the behavior prompt information may be "Please beckon to stop the vehicle." In practice, the executing body may send the behavior prompt information to a voice synthesis device installed on the autonomous vehicle, and then play the synthesized information through a speaker. Alternatively, the executing body may further send the behavior prompt information to a display screen installed on the autonomous vehicle to prompt the pedestrian to reflect the intention of stopping the vehicle or the like by making the corresponding behavior.

In some alternative implementations of the present embodiment, the behavior prompt information may include information representing prompting the pedestrian to approach to stop the vehicle. For example, the behavior prompt information may be "Please approach if wish to stop the vehicle, otherwise please stay away".

Step 202, determining whether a deceleration condition matching the behavior prompt information is satisfied based on acquired behavior information of the pedestrian.

In the present embodiment, the executing body may first acquire the behavior information of the pedestrian, and then compare the behavior information with the deceleration condition matching the behavior prompt information to determine whether the deceleration condition is satisfied.

In the present embodiment, the behavior information of the pedestrian may be used to represent the behavior of the pedestrian. The behavior information may be original data acquired by an information acquisition device such as a sensor or a camera installed on the autonomous vehicle, or may be a character combination for representing the behavior of the pedestrian, generated by analyzing and processing the original data.

As an example, the behavior information may be data for representing the change in the distance between the pedestrian and the autonomous vehicle, acquired by the executing body from a distance measuring apparatus. As another example, the behavior information of the pedestrian may alternatively be "01" or "00", which is used as the behavior information of the pedestrian for representing the behavior of the pedestrian beckoning or approaching the autonomous vehicle. The above "01" may be a recognition result generated by performing behavior recognition by the processor in the autonomous vehicle system based on video data acquired by the camera installed on the autonomous vehicle. The motion recognition may be that the video data is input to a pre-trained classifier, to output the recognition result. The classifier may be used to represent a corresponding relationship between the video data and the recognition result, and the recognition result may be used to represent whether the pedestrian in the video data makes a beckoning behavior. The classifier may be various existing classification models pre-trained using machine learning algorithms, such as the LSTM (Long Short-Term Memory) or the CNN (Convolution Neural Networks).

It should be noted that the executing body for performing the motion recognition may be the executing body of the method for controlling an autonomous vehicle. In this case, the behavior information acquired by the executing body of the method for controlling an autonomous vehicle is the original data. Then, the executing body or the method for controlling an autonomous vehicle may perform motion recognition on the original data using the foregoing method to determine the behavior of the pedestrian.

In the present embodiment, the executing body may determine whether the deceleration condition matching the behavior prompt information is satisfied based on the acquired behavior information. The deceleration condition usually matches the behavior prompt information. As an example, the behavior prompt information may be information for prompting the pedestrian to beckon to stop the vehicle. If the behavior information is information representing that the pedestrian has made the beckoning behavior, the executing body may determine that the deceleration condition matching the behavior prompt information is satisfied.

In some alternative implementations of the present embodiment, the behavior prompt information may be information representing prompting the pedestrian to approach to stop the vehicle. In these implementations, the executing body may determine that the deceleration condition matching the behavior prompt information is satisfied, in response to determining that the pedestrian is in a third target area. The third target area is generally located between the first area and the autonomous vehicle. It may be understood that, in practice, the third target area may also have various shapes similar to the first target area, such as the intersecting grid line areas shown in FIGS. 3B and 3C. Generally, the pedestrian approaching the autonomous vehicle first passes through the first target area and then enters the third target area.

Step 203, sending control information for reducing a moving speed of the autonomous vehicle, in response to determining that the deceleration condition is satisfied and determining that a speed of the autonomous vehicle is greater than a preset deceleration threshold.

In the present embodiment, the executing body may determine the current driving speed based on a speed sensor installed on the autonomous vehicle. Then, the current driving speed is compared with the preset deceleration threshold. In response to determining that the deceleration condition in step 202 is satisfied and determining that the current driving speed of the autonomous vehicle is greater than the preset deceleration threshold, the executing body may send the control information for reducing the moving speed of the autonomous vehicle. The control information for reducing the moving speed of the autonomous vehicle may be in various forms such as letters or numbers. In practice, the setting of the deceleration threshold is generally related to the preset distance condition described above. If the set distance threshold is large, it means that the autonomous vehicle is far away from the pedestrian when the pedestrian is detected, then the deceleration threshold may be set higher accordingly. Otherwise, if the set distance threshold is small, it means that the autonomous vehicle is close to the pedestrian when the pedestrian is detected, then the deceleration threshold needs to be set lower accordingly, so that the vehicle speed is low to ensure safety.

In the present embodiment, the executing body may send the control information for reducing the moving speed of the autonomous vehicle to the control system of the autonomous vehicle. Then, the control system of the autonomous vehicle sends a control command for reducing the moving speed of the autonomous vehicle to an apparatus that drives the autonomous vehicle to move. The executing body may alternatively directly send the control information for reducing the moving speed of the autonomous vehicle to the apparatus that drives the autonomous vehicle to move.

In some alternative implementations of the present embodiment, in response to determining that the pedestrian is in a second target area and determining that the autonomous vehicle is in a moving state, the executing body may alternatively send control information for stopping a movement of the autonomous vehicle. In these implementations, the second target area is generally located between the third area and the autonomous vehicle. It may be understood that, in practice, the second target area may also have various shapes similar to the first target area and the third target area, and detailed description thereof will be omitted. Generally, the pedestrian approaching the autonomous vehicle first passes through the first target area, then enters the third target area, and then enters the second target area. The control information for stopping the movement of the autonomous vehicle may be in various forms such as letters or numbers.

In some alternative implementations of the present embodiment, in response to determining that an object is in a fourth target area and determining that the autonomous vehicle is in the moving state, the executing body may alternatively send control information for emergency braking of the autonomous vehicle. In these implementations, the fourth target area is generally located between the second area and the autonomous vehicle. It may be understood that, in practice, the fourth target area may alternatively have various shapes similar to the first target area, the second target area and the third target area, and detailed description thereof will be omitted. Generally, the fourth target area is the area closest to the autonomous vehicle among the above four target areas. When the autonomous vehicle moves, if the pedestrian enters the fourth target area, the executing body sends the control information for emergency braking of the autonomous vehicle to avoid an accident. The control information for emergency braking or the autonomous vehicle may be in various forms such as letters or numbers.

In practice, the executing body may determine whether the autonomous vehicle is in the moving state based on the speed measured by the speed sensor installed on the autonomous vehicle, or may determine whether the autonomous vehicle is in the moving state based on information representing the driving state of the autonomous vehicle. The information representing the driving state of the autonomous vehicle may be in various forms. For example, "P" may be used to indicate the parking state; "F" may be used to indicate the state that the vehicle is driving forward; "B" may be used to indicate the state that the vehicle is driving backward; and "T" may be used to indicate the state in which the vehicle is turning.

Figure 4:
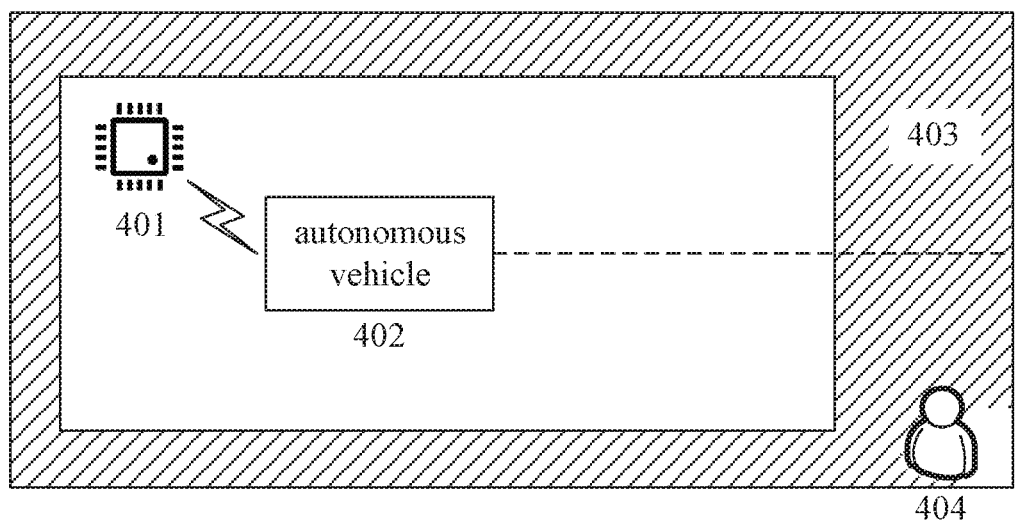
FIG. 4 is a schematic diagram of an application scenario of the method for controlling an autonomous vehicle according to the embodiments of the present disclosure.

With further reference to FIG. 4, FIG. 4 is a schematic diagram of an application scenario of the method for controlling an autonomous vehicle according to the embodiments of the present disclosure. In the application scenario of FIG. 4, in response to determining that a pedestrian 404 is in a first target area 403, a control apparatus 401 sends behavior prompt information "Please beckon to stop the vehicle" for prompting the pedestrian. Alternatively, a voice synthesis device (not shown in FIG. 4) installed on an autonomous vehicle 402 performs voice synthesis on the prompt information, and then plays the synthesized prompt information through a speaker (not shown in FIG. 4) installed on the autonomous vehicle 402. Next, the control apparatus 401 determines that a deceleration condition matching the behavior prompt information is satisfied based on acquired behavior information "01" representing the pedestrian 404 making a beckoning behavior. Then, the control apparatus 401 sends control information for reducing the moving speed of the autonomous vehicle 402 in response to determining that the deceleration condition is satisfied and determining that the speed 45 km/h of the autonomous vehicle 402 is greater than a preset deceleration threshold of 40 km/h.

In the method provided by the above embodiment of the present disclosure, first in response to determining that a pedestrian is in a first target area, behavior prompt information representing prompting the pedestrian to make a corresponding behaviour is sent, then whether a deceleration condition matching the behavior prompt information is satisfied is determined based on acquired behavior information of the pedestrian, and control information for reducing a moving speed of the autonomous vehicle is sent, in response to determining that the deceleration condition is satisfied and determining that a speed of the autonomous vehicle is greater than a preset deceleration threshold, thereby implementing deceleration control of the autonomous vehicle based on the response of the pedestrian to the behavior prompt information.

Figure 5:
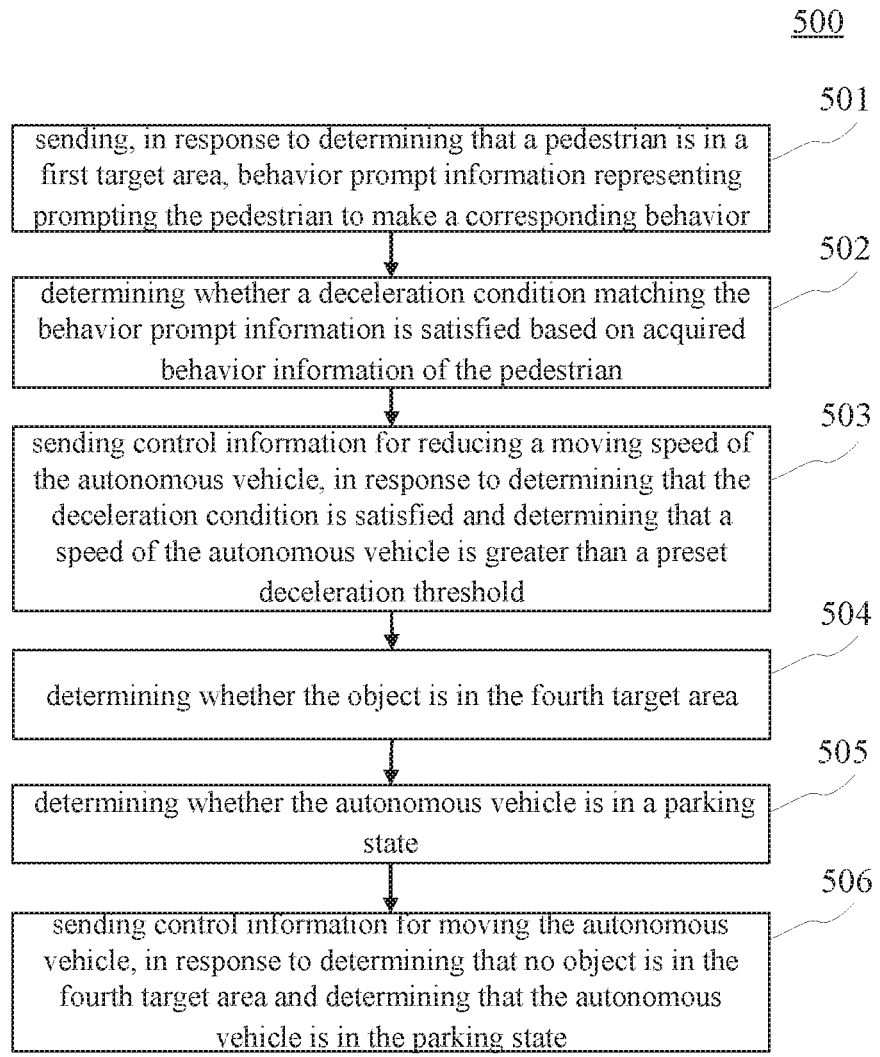
FIG. 5 is a flowchart of another embodiment of the method for controlling an autonomous vehicle according to the present disclosure.

With further reference to FIG. 5, a flow 500 of another embodiment of the method for controlling an autonomous vehicle is illustrated. The flow 500 of the method for controlling an autonomous vehicle includes the following steps 501 to 506.

Step 501, sending, in response to determining that a pedestrian is in a first target area, behavior prompt information representing prompting the pedestrian to make a corresponding behavior.

Step 502, determining whether a deceleration condition matching the behavior prompt information is satisfied based on acquired behavior information of the pedestrian.

Step 503, sending control information for reducing a moving speed of the autonomous vehicle, in response to determining that the deceleration condition is satisfied and determining that, a speed of the autonomous vehicle is greater than a preset deceleration threshold.

The steps 501, 502, and 503 are respectively consistent with the steps 201, 202, and 203 in the foregoing embodiment, and the descriptions of the steps 201, 202, and 203 are also applicable to the steps 501, 502, and 503, and detailed description thereof will be omitted.

Step 504, determining whether the object is in the fourth target area.

In the present embodiment, the executing body may perform obstacle detection using LiDAR (Light Detection and Ranging) installed on the autonomous vehicle to determine whether the object is in the fourth target area. The method for detecting an obstacle may be to perform object recognition on the image acquired by the camera installed on the autonomous vehicle using a deep learning algorithm. It should be noted that the obstacle detection technology is a well-known technology widely studied and applied at present, and detailed description thereof will be omitted.

Step 505, determining whether the autonomous vehicle is in a parking state.

In the present embodiment, the executing body may determine whether the autonomous vehicle is in the parking state based on the speed measured by the speed sensor installed on the autonomous vehicle or based on information representing the driving state of the autonomous vehicle. It should be noted that the method in which the executing body determines whether the autonomous vehicle is in the parking state may be consistent with the description of step 203 in the foregoing embodiment, and detailed description thereof will be omitted.

Step 506, sending control information for moving the autonomous vehicle, in response to determining that no object is in the fourth target area and determining that the autonomous vehicle is in the parking state.

In the present embodiment, in response to determining that no object is in the fourth target area and determining that the autonomous vehicle is in the parking state, the executing body may send the control information for moving the autonomous vehicle. The control information for moving the autonomous vehicle may be in various forms such as letters or numbers.

In the present embodiment, the executing body may send the control information for moving the autonomous vehicle to the control system of the autonomous vehicle. Then, the control system of the autonomous vehicle sends a control command for moving the autonomous vehicle to an apparatus that drives the autonomous vehicle to move. The executing body may alternatively directly send the control information for moving the autonomous vehicle to the apparatus that drives the autonomous vehicle to move.

In some alternative implementations of the present embodiment, the executing body may alternatively send the control information for moving the autonomous vehicle by the following steps.

The first step includes acquiring information representing whether a target vehicle-mounted device is in use.

The vehicle-mounted device may be an electronic device capable of realizing human-computer interaction, including but not limited to at least one of the following: a vending machine, or a self-service delivery container. The target vehicle-mounted device may be pre-designated or may be a vehicle-mounted device determined according to a certain rule. Generally, the target vehicle-mounted device may be in communication connection with the executing body. The executing body may acquire the information representing whether the vehicle-mounted device is in use from the target vehicle-mounted device. The information representing whether the vehicle-mounted device is in use may be in various forms such as letters or numbers. It should be noted that the target vehicle-mounted device and the executing body may be in communication connection through the vehicle-mounted Ethernet. Alternatively, in order to ensure that the connection is not interrupted, a heartbeat mechanism may also be employed.

The second step includes sending the control information for moving the autonomous vehicle, in response to determining that the acquired information is information representing that the target vehicle-mounted device is not in use.

In response to determining that the acquired information is information representing that the target vehicle-mounted device is not in use, the executing body may send the control information for moving the autonomous vehicle.

Alternatively, the executing body may alternatively acquire state information representing whether the target vehicle-mounted device malfunctions. Then, in response to determining that the target vehicle-mounted device does not malfunction, the executing body may send control information representing starting to move.

In these implementations, the state information may be in various forms, such as letters, numbers. As an example, "0" may be used to indicate that the vehicle-mounted device does not malfunction; and "1" may be used to indicate that the vehicle-mounted device malfunctions. The executing body may send the control information representing starting to move, in response to determining that the acquired state information represents that the vehicle-mounted device does not malfunction.

In some alternative implementations of the present embodiment, the executing body may alternatively send movement prompt information representing prompting yielding, in response to determining that the object is in the fourth target area. It may be understood that the fourth target area is an area close to the autonomous vehicle, and objects in the area may affect the driving of the autonomous vehicle. The executing body may determine whether the object is in the fourth target area by the above method for detecting an obstacle. In response to determining the presence of the object, the movement prompt information may be sent. The movement prompt information may be in various forms. As an example, the movement prompt information may be "vehicle is started, please evade". In practice, the executing body may send the movement prompt information to the voice synthesis device installed on the autonomous vehicle, and then play synthesized prompt information through the speaker. Alternatively, the executing body may send the movement prompt information to the display screen installed on the autonomous vehicle to prompt the pedestrian in the fourth target area to evade.

As can be seen from FIG. 5, compared with the embodiment corresponding to FIG. 2, the flow 500 of the method for controlling an autonomous vehicle in the present embodiment reflects the step of determining whether there is an object in the fourth target area, determining whether the autonomous vehicle is in a parking state, and in response to determining that there is no object in the fourth target area and determining that the autonomous vehicle is in the parking state, sending control information for moving the autonomous vehicle. Therefore, the solution described in the present embodiment may control the autonomous vehicle to start moving from the parking state in the case where it is determined that there is no obstacle around the autonomous vehicle, thereby realizing control of the starting the autonomous vehicle.

Figure 6:
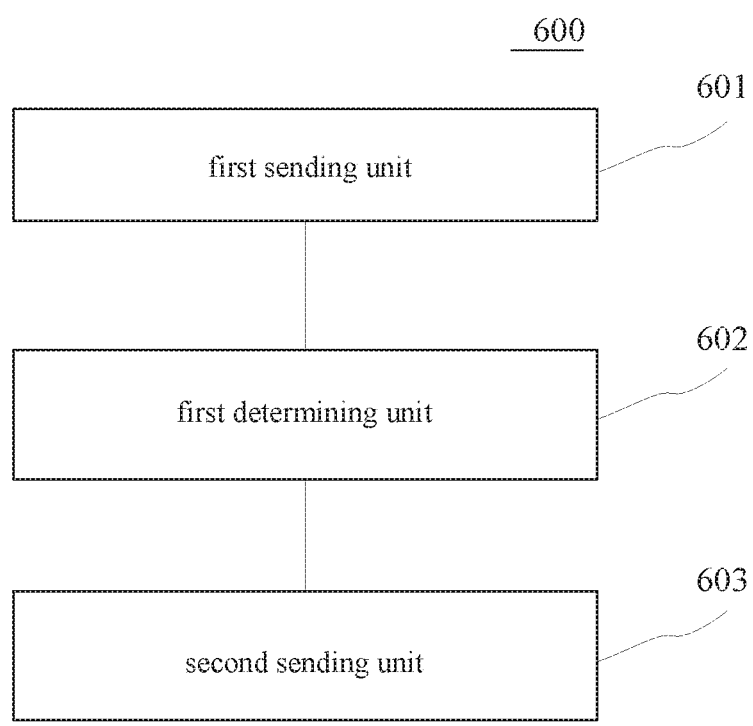
FIG. 6 is a schematic structural diagram of an embodiment of an apparatus for controlling an autonomous vehicle according to the present disclosure.

With further reference to FIG. 6, as an implementation of the method shown in the above figures, the present disclosure provides an embodiment of an apparatus for controlling an autonomous vehicle, and the apparatus embodiment corresponds to the method embodiment as shown in FIG. 2, and the apparatus may be specifically applied to various electronic devices.

As shown in FIG. 6, an apparatus 600 for controlling an autonomous vehicle provided by the present embodiment includes: a first sending unit 601, a first determining unit 602 and a second sending unit 603. The first sending unit 601 is configured to send, in response to determining that a pedestrian is in a first target area, behavior prompt information representing prompting the pedestrian to make a corresponding behavior. The first determining unit 602 is configured to determine whether a deceleration condition matching the behavior prompt information is satisfied based on acquired behavior information of the pedestrian. The second sending unit 603 is configured to send control information for reducing a moving speed of the autonomous vehicle, in response to determining that the deceleration condition is satisfied and determining that a speed of the autonomous vehicle is greater than a preset deceleration threshold.

In the present embodiment, in the apparatus 600 for controlling an autonomous vehicle, the specific processing and the technical effects thereof of the first sending unit 601, the first determining unit 602, and the second sending unit 603 may respectively refer to the related descriptions of step 201, step 202, and step 203 in the corresponding embodiment of FIG. 2, and detailed description thereof will be omitted.

In some alternative implementations of the present embodiment, the apparatus 600 for controlling an autonomous vehicle may further include a third sending unit (not shown in the figure), configured to send control information for stopping a movement of the autonomous vehicle, in response to determining that the pedestrian is in a second target area and determining that the autonomous vehicle is in a moving state.

In some alternative implementations of the present embodiment, the behavior prompt information includes information representing prompting the pedestrian to approach to stop the vehicle; and the first determining unit 602 may be further configured to: determine that the deceleration condition matching the behavior prompt information is satisfied, in response to determining that the pedestrian is in a third target area.

In some alternative implementations of the present embodiment, the apparatus 600 for controlling an autonomous vehicle may further include a fourth sending unit (not shown in the figure). The fourth sending unit may be configured to send control information for emergency braking of the autonomous vehicle, in response to determining that an object is in a fourth target area and determining that the autonomous vehicle is in the moving state.

In some alternative implementations of the present embodiment, the apparatus 600 for controlling an autonomous vehicle may further include a second determining unit (not shown in the figure), a third determining unit (not shown in the figure), and a fifth sending unit (not shown in the figure). The second determining, unit may be configured to determine whether the object is in the fourth target area. The third determining unit may be configured to determine whether the autonomous vehicle is in a parking state. The fifth sending unit may be configured to send control information for moving the autonomous vehicle, in response to determining that no object is in the fourth target area and determining that the autonomous vehicle is in the parking state.

In some alternative implementations of the present embodiment, the apparatus 600 for controlling an autonomous vehicle may further include a sixth sending unit (not shown in the figure). The sixth sending unit may be configured to send movement prompt information representing and prompting yielding, in response to determining that the object is in the fourth target area.

In some alternative implementations of the present embodiment, the fifth sending unit may include an acquisition module (not shown in the figure) and a sending module (not shown in the figure). The acquisition module may be configured to acquire information representing whether a target vehicle-mounted device is in use. The sending module may be configured to send the control information for moving the autonomous vehicle, in response to determining that the acquired information is information representing that the target vehicle-mounted device is not in use.

In some alternative implementations of the present embodiment, the sending module may include: an acquisition submodule (not shown in the figure) and a sending submodule (not shown in the figure). The acquisition submodule may be configured to acquire state information representing whether the target vehicle-mounted device malfunctions. The sending submodule may be configured to send the control information for moving the autonomous vehicle, in response to determining that the target vehicle-mounted device does not malfunction.

In the apparatus provided by the above embodiment of the present disclosure, the first sending unit 601 first sends, in response to determining that a pedestrian is in a first target area, behavior prompt information representing prompting the pedestrian to make a corresponding behavior. Then, the first determining unit 602 determines whether a deceleration condition matching the behavior prompt information is satisfied based on acquired behavior information of the pedestrian. Next, the second sending unit 603 sends control information for reducing a moving speed of the autonomous vehicle, in response to determining that the deceleration condition is satisfied and determining that a speed of the autonomous vehicle is greater than a preset deceleration threshold, thereby implementing deceleration control or the autonomous vehicle based on the response of the pedestrian to the behavior prompt information.

Figure 7:
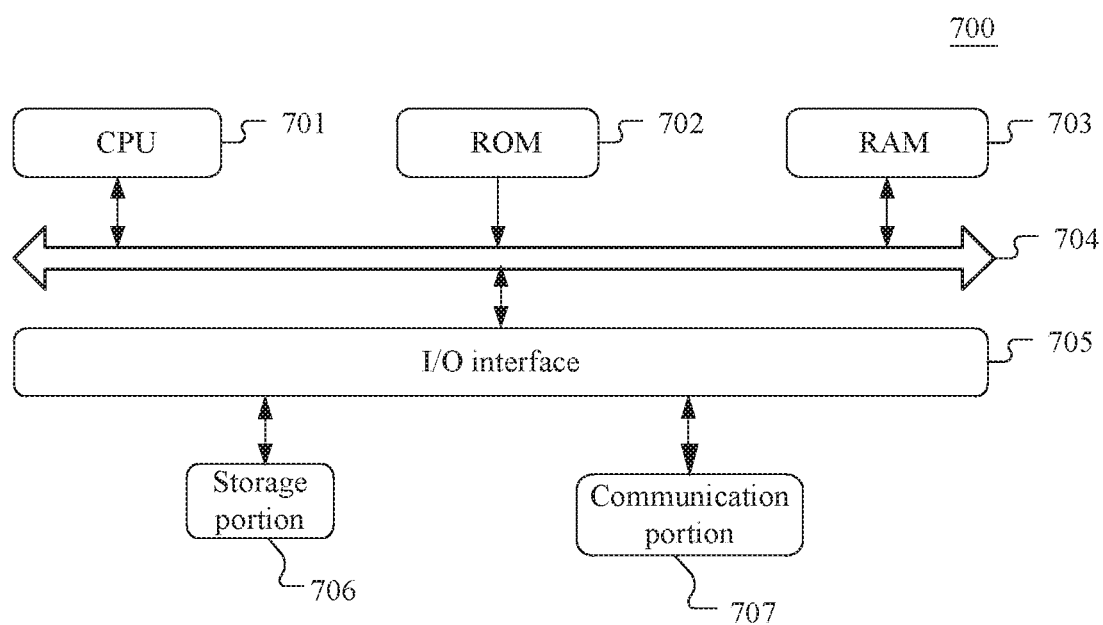
FIG. 7 is a schematic structural diagram of a computer system adapted to implement an electronic device of the embodiments of the present disclosure.

With further reference to FIG. 7, a schematic structural diagram of a computer system 700 adapted to implement an electronic device of the embodiments of the present disclosure is shown. The electronic device shown in FIG. 7 is merely an example, and should not impose any limitation on the function and scope of use of the embodiments of the present disclosure.

As shown in FIG. 7, the computer system 700 may include a central processing unit (CPU) 701, which may execute various appropriate actions and processes in accordance with a program stored in a read-only memory (ROM) or a program loaded into a random access memory (RAM) 703 from a storage portion 706. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components may be connected to the I/O interface 705: a storage portion 706 including a hard disk and the like; and a communication portion 707 including a network interface card, such as a LAN card and a modem. The communication portion 707 performs communication processes via a network, such as the Internet.

It should be noted that the above electronic device may be a standalone device or may be installed in an autonomous vehicle. When the electronic device is installed in the autonomous vehicle, the above functions may also be integrated in the processor of the control system of the autonomous vehicle. In this case, an input portion including such as a camera, a sensor, a radar, an output portion including such as a liquid crystal display (LCD), a speaker, and a motor driver may be connected to the I/O interface 705 as needed. The motor driver may drive a moving apparatus to complete the movement of the autonomous vehicle based on control information sent by the CPU. The driver is also connected to the I/O interface 705 as needed. A removable medium, such as a magnetic disk, an optical disk, a magneto-optical disk, and a semiconductor memory, may be installed on the driver as needed, to facilitate the installation of a computer program read from the removable medium, on the storage portion 706 as needed. Thereby, the central processing unit (CPU) 701 may control the output portion to send behavior prompt information, and acquire the behavior information of the pedestrian from the outside through the input portion, when invoking the computer program to execute the function of controlling the autonomous vehicle.

In particular, according to the embodiments of the present disclosure, the process described above with reference to the flow chart may be implemented in a computer software program. For example, an embodiment, of the present disclosure includes a computer program product, which includes a computer program that is embedded in a computer-readable medium. The computer program includes program codes for performing the method as illustrated in the flow chart. In such an embodiment, the computer program may be downloaded and installed from a network via the communication portion 707. The computer program, when executed by the central processing unit (CPU) 701, implements the above mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-RCM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including a first sending unit, a first determining unit and a second sending unit. Here, the names of these units do not in some cases constitute limitations to such units themselves. For example, the first sending unit may also be described as "a unit configured to send, in response to determining that a pedestrian is in a first target area, behavior prompt information representing prompting the pedestrian to make a corresponding behavior".

In another aspect, the present disclosure further provides a computer readable medium. The computer readable medium may be included in the electronic device in the above described embodiments, or a stand-alone computer readable medium not assembled into the electronic device. The computer readable medium carries one or more programs. The one or more programs, when executed by the electronic device, cause the electronic device to: send, in response to determining that a pedestrian is in a first target area, behavior prompt information representing prompting the pedestrian to make a corresponding behavior; determine whether a deceleration condition matching the behavior prompt information is satisfied based on acquired behavior information of the pedestrian; and send control information for reducing a moving speed of the autonomous vehicle, in response to determining that the deceleration condition is satisfied and determining that a speed of the autonomous vehicle is greater than a preset deceleration threshold.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure.

Technical schemes formed by the above-described features being interchanged with, but not limited to, technical features with similar functions disclosed in the present disclosure are examples.

What is claimed is:

1. A method for controlling an autonomous vehicle, the method comprising:
    sending, in response to determining that a pedestrian is in a first target area, behavior prompt information representing prompting the pedestrian to make a corresponding behavior, the behavior prompt information comprises information representing prompting the pedestrian to approach to stop the vehicle;
    determining whether a deceleration condition matching the behavior prompt information is satisfied based on acquired behavior information of the pedestrian, wherein determining whether the deceleration condition matching the behavior prompt information is satisfied, comprises: determining that the deceleration condition matching the behavior prompt information is satisfied, in response to determining that the pedestrian is in a third target area;
    sending control information for reducing a moving speed of the autonomous vehicle and controlling the vehicle to reduce the moving speed, in response to determining that the deceleration condition is satisfied and determining that a speed of the autonomous vehicle is greater than a preset deceleration threshold; and
    sending control information for stopping a movement of the autonomous vehicle and controlling the autonomous vehicle to stop the movement, in response to determining that the pedestrian is in a second target area and determining that the autonomous vehicle is in a moving state, wherein the third target area is located between the first target area the second target area.

2. The method according to claim 1, wherein the method further comprises:
    sending control information for emergency braking of the autonomous vehicle, in response to determining that an object is in a fourth target area and determining that the autonomous vehicle is in the moving state.

3. The method according to claim 2, wherein the method further comprises:
    determining whether the object is in the fourth target area;
    determining whether the autonomous vehicle is in a parking state; and
    sending control information for moving the autonomous vehicle, in response to determining that no object is in the fourth target area and determining that the autonomous vehicle is in the parking state.

4. The method according to claim 3, wherein the method further comprises:
    sending movement prompt information representing prompting yielding, in response to determining that the object is in the fourth target area.

5. The method according to claim 4, wherein the sending control information for moving the autonomous vehicle comprises:
    acquiring information representing whether a target vehicle-mounted device is in use; and
    sending the control information for moving the autonomous vehicle, in response to determining that the acquired information is information representing that the target vehicle-mounted device is not in use.

6. The method according to claim 5, wherein the sending control information for moving the autonomous vehicle comprises:

acquiring state information representing whether the target vehicle-mounted device malfunctions; and sending the control information for moving the autonomous vehicle, in response to determining that the target vehicle-mounted device does not malfunction.

7. An apparatus for controlling an autonomous vehicle, the apparatus comprising:
   at least one processor; and
   a memory storing instructions, wherein the instructions when executed by the at least one processor, cause the at least one processor to perform operations, the operations comprising:
   sending, in response to determining that a pedestrian is in a first target area, behavior prompt information representing prompting the pedestrian to make a corresponding behavior, the behavior prompt information comprises information representing prompting the pedestrian to approach to stop the vehicle;
   determining whether a deceleration condition matching the behavior prompt information is satisfied based on acquired behavior information of the pedestrian, wherein determining whether the deceleration condition matching the behavior prompt information is satisfied, comprises: determining that the deceleration condition matching the behavior prompt information is satisfied, in response to determining that the pedestrian is in a third target area;
   sending control information for reducing a moving speed of the autonomous vehicle and controlling the vehicle to reduce the moving speed, in response to determining that the deceleration condition is satisfied and determining that a speed of the autonomous vehicle is greater than a preset deceleration threshold; and
   sending control information for stopping a movement of the autonomous vehicle and controlling the autonomous vehicle to stop the movement, in response to determining that the pedestrian is in a second target area and determining that the autonomous vehicle is in a moving state, wherein the third target area is located between the first target area the second target area.

8. The apparatus according to claim 7, wherein the operations further comprise:
   sending control information for emergency braking of the autonomous vehicle, in response to determining that an object is in a fourth target area and determining that the autonomous vehicle is in the moving state.

9. The apparatus according to claim 8, wherein the operations further comprise:
   determining whether the object is in the fourth target area;
   determining whether the autonomous vehicle is in a parking state; and
   sending control information for moving the autonomous vehicle, in response to determining that no object is in the fourth target area and determining that the autonomous vehicle is in the parking state.

10. The apparatus according to claim 9, wherein the operations further comprise:

sending movement prompt information representing prompting yielding, in response to determining that the object is in the fourth target area.

11. The apparatus according to claim 10, wherein the sending control information for moving the autonomous vehicle comprises:
    acquiring information representing whether a target vehicle-mounted device is in use; and
    sending the control information for moving the autonomous vehicle, in response to determining that the acquired information is information representing that the target vehicle-mounted device is not in use.

12. The apparatus according to claim 11, wherein the sending control information for moving the autonomous vehicle comprises:
    acquiring state information representing whether the target vehicle-mounted device malfunctions; and
    sending the control information for moving the autonomous vehicle, in response to determining that the target vehicle-mounted device does not malfunction.

13. An autonomous vehicle, comprising the apparatus according to claim 7.

14. A non-transitory computer readable medium, storing a computer program thereon, the program, when executed by a processor, causes the processor to perform operations, the operations comprising:
    sending, in response to determining that a pedestrian is in a first target area, behavior prompt information representing prompting the pedestrian to make a corresponding behavior, the behavior prompt information comprises information representing prompting the pedestrian to approach to stop the vehicle;
    determining whether a deceleration condition matching the behavior prompt information is satisfied based on acquired behavior information of the pedestrian, wherein determining whether the deceleration condition matching the behavior prompt information is satisfied, comprises: determining that the deceleration condition matching the behavior prompt information is satisfied, in response to determining that the pedestrian is in a third target area;
    sending control information for reducing a moving speed of the autonomous vehicle and controlling the vehicle to reduce the moving speed, in response to determining that the deceleration condition is satisfied and determining that a speed of the autonomous vehicle is greater than a preset deceleration threshold; and
    sending control information for stopping a movement of the autonomous vehicle and controlling the autonomous vehicle to stop the movement, in response to determining that the pedestrian is in a second target area and determining that the autonomous vehicle is in a moving state, wherein the third target area is located between the first target area the second target area.

* * * * *